(12) United States Patent
Turner

(10) Patent No.: US 10,305,274 B2
(45) Date of Patent: May 28, 2019

(54) PRE-MAGNETIZING A TRANSFORMER CONNECTED TO A MODULAR MULTILEVEL POWER CONVERTER

(71) Applicant: ABB Schweiz AG, Baden (CH)

(72) Inventor: Robert Turner, Hastings (NZ)

(*) Notice: Subject to any disclaimer, the term of this patent is extended or adjusted under 35 U.S.C. 154(b) by 25 days.

(21) Appl. No.: 15/489,203

(22) Filed: Apr. 17, 2017

(65) Prior Publication Data

US 2017/0222429 A1    Aug. 3, 2017

Related U.S. Application Data

(63) Continuation of application No. PCT/EP2015/071749, filed on Sep. 22, 2015.

(30) Foreign Application Priority Data

Oct. 17, 2014 (EP) .................... 14189388

(51) Int. Cl.
*H02M 1/36* (2007.01)
*H02H 9/00* (2006.01)
(Continued)

(52) U.S. Cl.
CPC ............ *H02H 9/002* (2013.01); *H02H 9/045* (2013.01); *H02M 1/36* (2013.01); *H02M 1/40* (2013.01);
(Continued)

(58) Field of Classification Search
CPC ............ H02M 5/10; H02M 5/22; H02M 7/12; H02M 1/42
See application file for complete search history.

(56) References Cited

U.S. PATENT DOCUMENTS 3,697,855 A * 10/1972 Kernick ............ H02M 7/53871
363/41
5,479,086 A    12/1995 Konstanzer
(Continued)

FOREIGN PATENT DOCUMENTS

EP    1024574 A2    8/2000
EP    1858147 A2    11/2007
(Continued)

OTHER PUBLICATIONS

European Patent Office, International Search Report & Written Opinion issued in corresponding Application No. PCT/EP2015/071749, dated Nov. 23, 2015, 12 pp.
European Patent Office, Extended Search Report issued in corresponding Application No. 14189388.3, dated May 29, 2015, 6 pp.

*Primary Examiner* — Jue Zhang
*Assistant Examiner* — Lakaisha Jackson
(74) *Attorney, Agent, or Firm* — Taft Stettinius & Hollister LLP; J. Bruce Schelkopf

(57) ABSTRACT

The present invention is concerned with pre-magnetizing a Modular Multilevel power Converters connected transformer in order to moderate inrush currents upon connecting the transformer to an electric grid. The invention takes advantage of the high amount of stored energy in MMC converters as compared to other converter types. This stored energy is used to pre-magnetize the converter-connected transformer, therefore no additional or dedicated pre-magnetizing hardware is required in addition to the charging hardware provided to charge the converter capacitors. As the transformer pre-magnetizing takes place subsequent to the converter charging, the converter charging circuit is not used to, and therefore does not need to be designed to, directly magnetize the transformer.

20 Claims, 3 Drawing Sheets

(51) Int. Cl.
  *H02M 1/40*  (2007.01)
  *H02H 9/04*  (2006.01)
  *H02M 1/42*  (2007.01)
  *H02M 5/22*  (2006.01)
  *H02M 7/12*  (2006.01)
  *H02M 7/48*  (2007.01)
  H02H 7/045  (2006.01)
  H02M 5/12  (2006.01)
  H02M 7/483  (2007.01)

(52) U.S. Cl.
  CPC ............... *H02M 1/42* (2013.01); *H02M 5/22* (2013.01); *H02M 7/12* (2013.01); *H02M 7/48* (2013.01); H02H 7/0455 (2013.01); H02M 5/12 (2013.01); H02M 2007/4835 (2013.01)

(56) References Cited

U.S. PATENT DOCUMENTS

| | | | |
|---|---|---|---|
| 2011/0013441 A1* | 1/2011 | Gruber | H02M 1/36 363/154 |
| 2014/0062221 A1 | 3/2014 | Papastergiou et al. | |
| 2015/0155716 A1* | 6/2015 | Balda | H02M 5/4585 363/35 |
| 2015/0229234 A1* | 8/2015 | Park | H02M 1/12 363/78 |

FOREIGN PATENT DOCUMENTS

| | | |
|---|---|---|
| EP | 2773032 A1 | 9/2014 |
| WO | 2007022414 A1 | 2/2007 |

\* cited by examiner

# PRE-MAGNETIZING A TRANSFORMER CONNECTED TO A MODULAR MULTILEVEL POWER CONVERTER

FIELD OF THE INVENTION

The invention relates to the field of modular multilevel converters, and specifically to pre-magnetizing of a converter connected transformer in order to moderate inrush currents upon connecting the transformer to an electric grid.

BACKGROUND OF THE INVENTION

A Modular Multilevel power Converter (MMC), also known as Chain-Link Converter (CLC), comprises a plurality of converter cells, or converter (sub-) modules, serially connected in converter branches that in turn may be arranged in a wye/star, delta, and/or indirect converter topology. Each converter cell comprises, in the form of a half-bridge or full-bridge circuit, a capacitor for storing energy and power semiconductor switches such as insulated gate bipolar transistor (IGBT) devices, gate-turn-off thyristor (GTO) devices, or MOSFETs for connecting the capacitor to the converter branch with one or two polarities. The voltage per converter cell capacitor may be between 1 kV and 3 kV; whereas the voltage of a converter branch may be in a range from 10 kV to several 100 kV. An MMC controller with a processor and corresponding software, or an FPGA, is responsible for controlling the converter cells and operating the power semiconductor switches based on a pulse width modulation scheme.

MMCs may be used in electric power transmission systems as ac-only Static VAR Compensators (Statcoms) and/or Flexible AC Transmission Systems (FACTS) devices for static power-factor correction as well as for voltage quality and stability purposes. A Statcom provides reactive power support to an electric power transmission network or grid to which the Statcom is connected by producing or absorbing reactive power.

An operating MMC has a certain amount of stored energy which must be provided to the converter before connecting the converter to the electric grid. To that purpose, charging of the converter cell capacitors is conventionally executed by way of passive charging or by way of active charging under control of dedicated charging controllers.

Connection of the MMCs to the electric grid generally involves a main transformer, whereby for Statcom applications the main transformer may be integrated with the MMC converter and/or arranged inside the same enclosure as the MMC. Transformer inrush is an undesired or often unacceptable effect of directly connecting a transformer to an electric grid. Uncontrolled, and specifically unlimited, transformer inrush currents may lead to saturation of the transformer core and corresponding inductance drop. Therefore, it may be required to first "pre-magnetize" the transformer such that upon grid connection there is no or little inrush current. Transformer pre-magnetization is also known as "flux alignment" or "transformer synchronization" implying that the primary, or grid-side voltage of the transformer is aligned, or synchronized, to both amplitude and phase of the AC grid voltage.

According to the patent application EP 1024574 A2 a transformer connected to an AC network via a power switch in an unsynchronized manner causes both inrush currents that are detrimental to the switch, as well as residual DC currents through unbalanced transformer core saturation that are inacceptable for traction applications. Therefore, EP 1024574 A2 discloses performing a regulated or controlled, network synchronous transformer magnetization by means of a pulse current converter connected to a secondary winding of the transformer, and using system parameters such as network voltage, network current, and input current of the pulse current converter. The transformer magnetization takes place during a few AC cycles prior to connection of the transformer to an AC voltage network, by means of a pre-charging DC/DC converter device connected to an intermediate DC circuit of the pulse current converter. The pulse current converter operates synchronous to the network voltage, and the magnetizing current generated by the converter is measured and the modulation is adapted accordingly to avoid DC current components. Transformer core saturation effects are inferred from the magnetizing current exceeding a threshold, or from an increase in a time derivative of the magnetizing current.

In this context, ramping of a transformer magnetizing voltage by means of an inverter results in small saturation currents that align the transformer flux and that are lower than an inverter current rating. Hence no dedicated intervention or corresponding controller is needed, which is particularly important for high power inverters, including IGCT based converters, which have a smaller control bandwidth compared to MMC converters. The voltage ramping may take tens or hundreds of cycles depending on the transformer characteristics and an external power source such as the DC/DC converter of EP 1024574 may thus be indispensable.

The patent application EP 1858147 A2 discloses a current conversion circuit with a power transformer connected to an alternating current supplying input via switching units for receiving an alternating current, and with a rectifier connected to output of the power transformer to provide a direct current to a capacitor connected between output terminals of the rectifier. A capacitor pre-charging circuit with a three phase auxiliary transformer connected to the output of the power transformer is used for pre-charging the capacitor and concurrently ensures magnetization of the power transformer before switching of the power transformer, and hence preventing high switching currents in the input of the transformer due to saturation of the transformer. The appropriately sized auxiliary transformer with a power rating sufficient to pre-magnetize the power transformer as well as to charge the converter incurs additional cost.

DESCRIPTION OF THE INVENTION

It is therefore an objective of the invention to simplify pre-magnetizing of a modular multilevel converter connected transformer in order to moderate inrush currents upon connecting the transformer to an electric grid. This objective is achieved by a method and a controller according to the independent claims. Preferred embodiments are evident from the dependent patent claims.

The invention makes use of the unique characteristics of Modular Multilevel power Converters (MMC) and takes advantage of the high amount of stored energy in MMC converters as compared to other converter types. This stored energy is used to pre-magnetize a converter-connected main transformer, therefore no additional or dedicated pre-magnetizing hardware is required in addition to the charging hardware provided to charge the converter capacitors. As the transformer pre-magnetizing takes place subsequent to the converter charging, the converter charging circuit is not used to, and therefore does not need to be designed to, directly magnetize the main transformer.

According to the invention, a method of pre-magnetizing a main transformer connectable to a Modular Multilevel power Converter MMC with a plurality of converter cells each including a cell capacitor and power semiconductor switches starts with disconnecting, by way of a line disconnector, the main transformer from the MMC. Following this, the cell capacitors of the MMC are charged, and upon completion of the capacitor charging, the main transformer is re-connected by way of the line disconnector. The main transformer is then pre-magnetized from energy stored in the cell capacitors of the MMC, and ultimately connected to an AC grid by way of a main circuit breaker.

In a preferred variant of the invention, a charging unit including an auxiliary power source and an optional auxiliary transformer is connectable to ac terminals of the MMC by means of a charging switch. Prior to pre-magnetization of the main transformer, the charging unit is disconnected from the MMC.

In advantageous embodiments of the invention a network voltage of the AC grid is measured and a converter voltage reference for an MMC controller of the MMC is derived there from. The converter voltage reference is corrected, or adjusted, prior to being fed to the MMC controller, in order to prevent saturation of a transformer core. Specifically, a magnetic transformer flux vector in the transformer is estimated, or calculated, in a feed-forward control, from the converter voltage reference. A transformer flux magnitude of the transformer flux is compared to a flux magnitude limit of the transformer, and in case of the limit being exceeded, a correction term is generated and subtracted from the converter voltage reference.

In summary, the control method for transformer magnetization by using converter stored energy to align transformer flux to the grid in order to minimize inrush current does not require any additional power source and does not involve a DC intermediate circuit of the converter. In other words, the method allows a conventional low-power and low-cost impedance-limited AC supply to be used to charge exclusively the converter, including MMC delta or why (star) STATCOM configurations devoid of a DC bus. This reduces engineering effort and material cost, especially for system configurations with converter transformers with primary voltages in excess of 100 kV, and/or a rated power in excess of 10 MVA, and/or low short-circuit impedance ratios of the feeder to the transformer for which the resulting inrush current would be unacceptable or detrimental. The broad converter switching bandwidth of MMC converters enables the implementation of fast feed-forward and fast feedback mechanisms. The latter allow the converter to magnetize the transformer without voltage ramping, both in the presence and absence of remanent transformer magnetization, and in a manner fast enough so that the MMC capacitors are not unduly depleted but can still operate upon completion of the transformer magnetization.

BRIEF DESCRIPTION OF THE DRAWINGS

The subject matter of the invention will be explained in more detail in the following text with reference to preferred exemplary embodiments which are illustrated in the attached drawings, in which.

In principle, identical parts are provided with the same reference symbols in the figures.

DETAILED DESCRIPTION OF PREFERRED EMBODIMENTS

The invention is equally advantageous for all kinds of transformer-connected Modular Multilevel power Converter (MMC) applications. By way of example, the MMC may be used in electric power transmission systems as Static VAR Compensator (Statcom) for static power-factor correction. AC-only Statcoms provide reactive power support to an electric power grid by producing or absorbing reactive power. The MMC may likewise be used as MMC converter/inverter adapted for converting dc current into ac current and/or vice versa, for converting a single or multi-phase current into another single or multi-phase current, or for connecting a load or power source with a power grid. Specifically, the MMC converter/inverter may be an indirect AC-DC or AC-AC converter, with top and bottom branches forming two parallel wye circuits, and with a neutral point of each wye circuit being connected to a respective DC or two-phase AC terminal.

Figure 1:
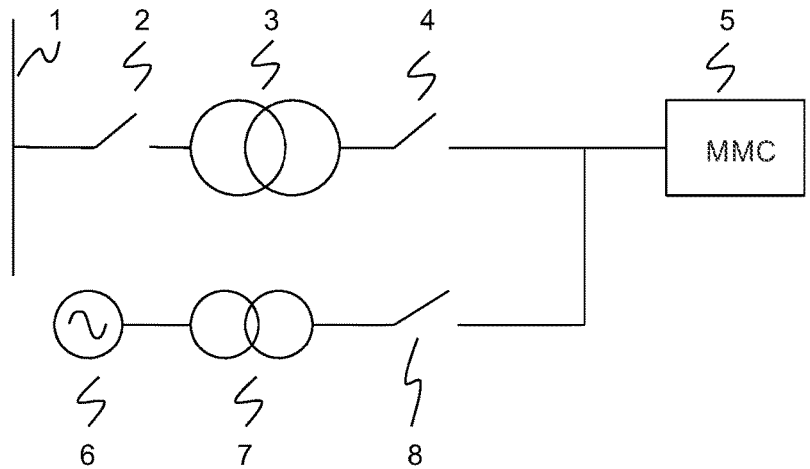
FIG. 1 schematically shows an exemplary initialization set-up for a single MMC.

FIG. 1 depicts an exemplary MMC initialization set-up. A three phase AC power grid 1 is connectable via a main circuit breaker, or converter feeder breaker, 2 to a primary side of a main, or power, transformer 3. A secondary side of the main transformer is connectable, via converter disconnetor 4, to ac terminals of an MMC 5. A charging unit including an auxiliary power source 6 and a dedicated auxiliary or charging transformer 7 to which the source 6 is connectable, is connectable to the ac terminals of the MMC via a charging switch, or disconnector, 8. Converter disconnector 4 is provided in the supply line between the main transformer 3 and a connection point of the charging unit in order to allow disconnecting the main transformer 3 during charging.

Figure 2:
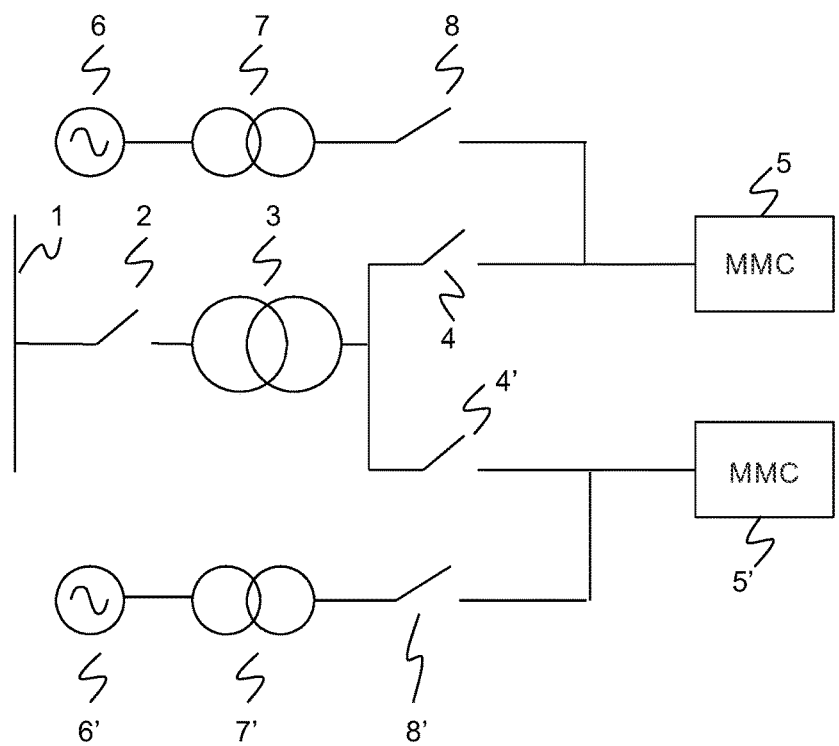
FIG. 2 schematically shows an exemplary initialization set-up for two MMCs.

FIG. 2 depicts the MMC setup for two parallel-connected MMC converters 5, 5' coupled, via respective converter disconnectors 4, 4', to a respective secondary winding of the main transformer 3. The two converters have dedicated charging units including auxiliary power source 6, 6', auxiliary transformer 7, 7', and a charging switch 8, 8'. Alternatively, two parallel main transformers may be provided to feed the two MMCs, wherein a single MMC 5 may be sufficient to align the flux of both transformers.

The proposed transformer pre-magnetization approach includes the following stages:

1. The converter capacitors are charged from the auxiliary power source while the converter is disconnected from the transformer. Common-mode charging is also possible in this configuration.

2. When the converter is completely charged, or at least sufficiently charged for the subsequent transformer magnetization process to reproduce a grid voltage on the primary side, the charging unit or charging circuit is disconnected by opening the charging switch, and the converter is connected to the transformer by closing the converter disconnector.

3. Transformer magnetization algorithms are executed as described below. In exceptional circumstances, another converter charging process including stages 1 and 2 above may be required to compensate for depleted converter capacitors prior to normal application operation.

4. After the main transformer is magnetized, the transformer is connected to the grid by closing the main circuit breaker. The converter may now begin its normal grid-connected operation.

The transformer magnetization and saturation prevention algorithm of stage 3 above results in a time-dependent converter voltage reference $V_{ref}$ to be provided to an MMC controller of the MMC converter. The MMC controller in turn determines the switching modulation of the semiconductor switches of the MMC based on $V_{ref}$, which ultimately generate the transformer magnetizing current $I_{mag}$.

Figure 3:
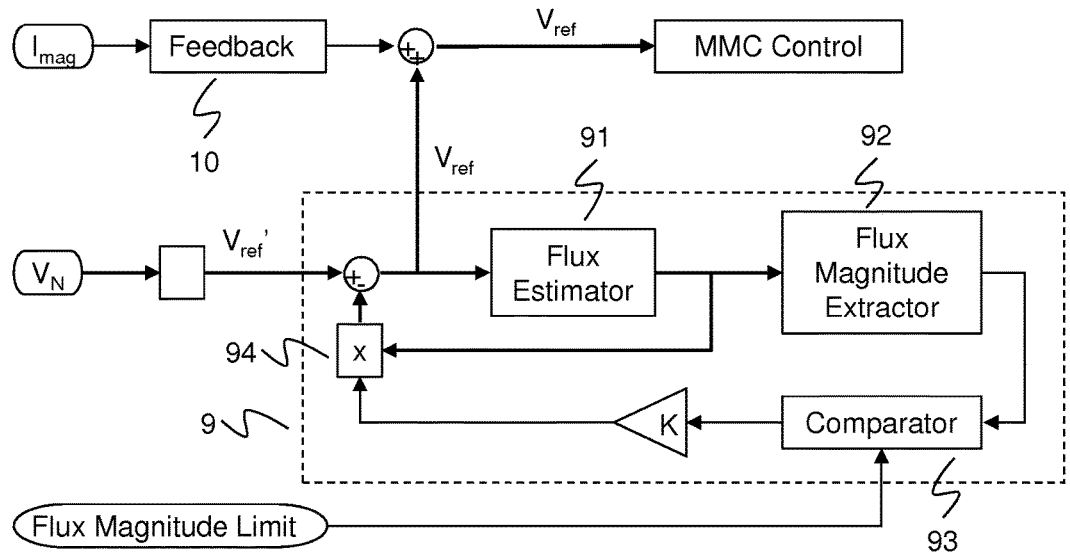
FIG. 3 illustrates a transformer magnetization and saturation prevention algorithm.

FIG. 3 exemplifies the algorithm of stage 3. Amplitude and phase angle of the network voltage $V_N$ of the three phase AC power grid to which the grid-side, or primary side, of the main transformer needs to be synchronized is being measured. A target converter voltage reference $V_{ref}'$ is determined based on $V_N$ and a transformer ratio of the main transformer. The target voltage reference $V_{ref}'$ increases from zero to a steady state value corresponding to the network voltage $V_N$ in a manner that causes perfect transformer flux alignment to the network voltage.

In a feed-forward transformer flux estimation and reference voltage synchronizer 9 the target converter voltage reference $V_{ref}'$ is corrected in view of a magnetic flux limit of the transformer core of the main transformer. To that purpose, in a flux estimator 91, a rotating transformer flux vector is estimated based on first principles including a time-integral of an actual converter reference voltage $V_{ref}$, assuming that the flux starts from zero, or an otherwise known value. In a flux magnitude extractor 92, a transformer flux magnitude is determined from the vector components of the transformer flux vector. A transformer flux magnitude limit is defined based on either a specified or nominal rated flux value for the main transformer, where a nominal flux vector magnitude typically corresponds with the nominal or peak operating voltage. In a flux magnitude comparator 93, the transformer flux magnitude is compared to the specified flux magnitude limit, and in case the former exceeds the latter, a scalar correction or conversion factor based on the excess flux magnitude and a gain K is provided to a multiplier 94. In the multiplier, the correction factor is multiplied with the estimated transformer flux to provide a correction term, which in turn is subtracted from the target converter voltage reference $V_{ref}'$ to produce the actual, or corrected, converter voltage reference $V_{ref}$.

Figure 4:
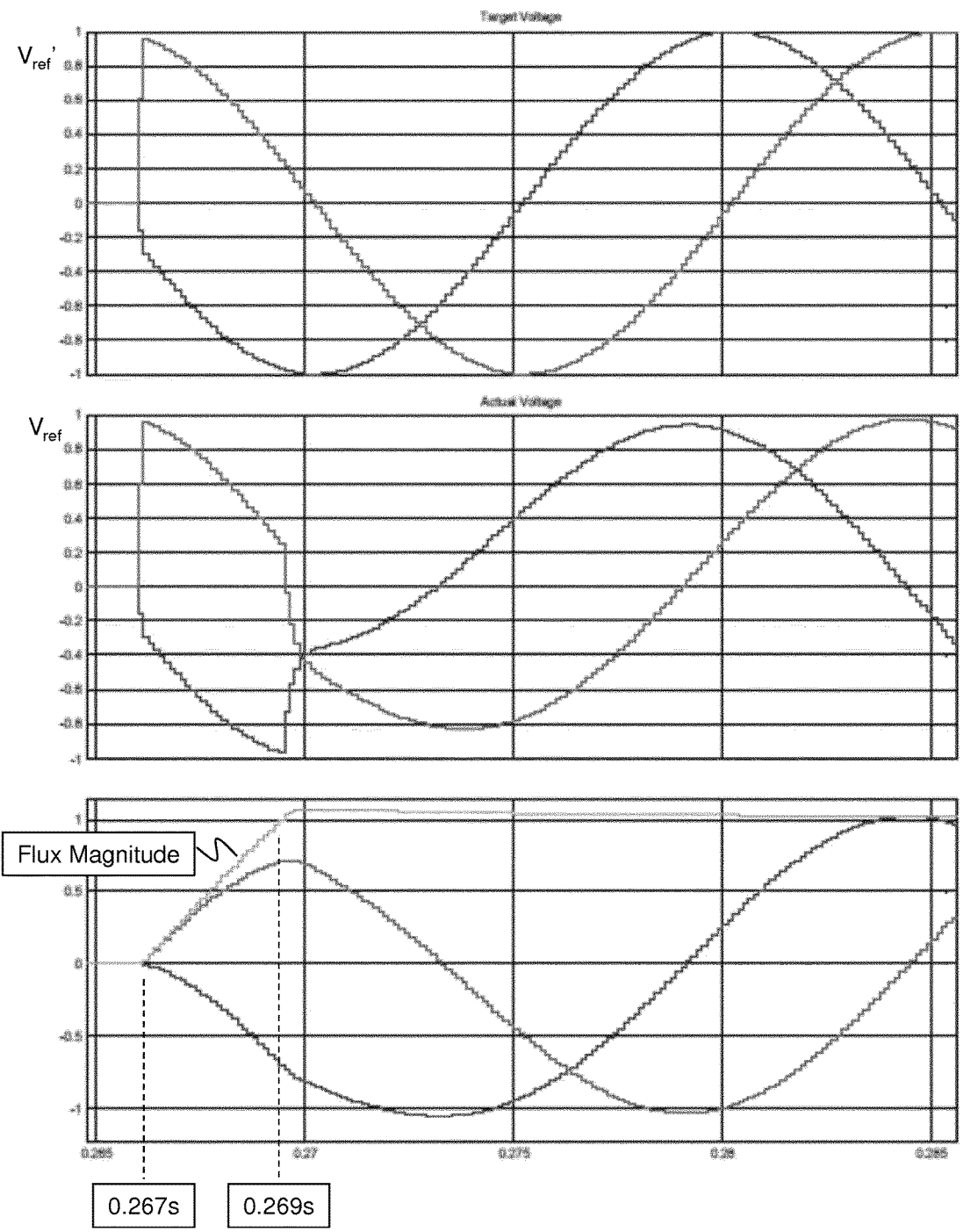
FIG. 4 shows components of reference voltage and estimated transformer flux vectors.

FIG. 4 shows, in the top graph or plot, two components of a rotating vector of the 3-phase target converter reference voltage $V_{ref}'$ in a stationary reference frame. In the second graph, the actual reference voltage $V_{ref}$ is depicted, while the bottom graph depicts both the two components and the magnitude of the estimated transformer flux vector for a correctly operating feed-forward mechanism. At time t=0.267 s the transformer magnetization process sets in, starting from zero converter voltage and zero transformer flux. Both the target reference voltage and the actual reference voltage increase rapidly, as does the transformer flux vector magnitude. At about time t=0.269 s, the flux vector magnitude exceeds the limit (a value of one per unit), and a correction term is applied to each phase of the 3-phase target converter reference voltage which leads to the actual voltage reference $V_{ref}$ in the middle graph departing noticeably from the target voltage reference $V_{ref}'$. As time proceeds further, the transformer flux magnitude excess slowly decreases, yet with a residual correction to the voltage reference resulting in the actual voltage reference having a slightly (below 5%) lower amplitude compared to the target reference voltage.

The transformer magnetizing process may be defined as completed after one cycle, or even half a cycle, if the actual transformer does not saturate, or after three cycles if the transformer saturates and a feedback controller engages as described below. In practice, the magnetization may be made to take one or two cycles to prevent any ringing or overshoot due to the converter response. With the magnetization being completed that quickly, the depletion of the MMC capacitors is very small, and the time it takes for the mechanical main circuit breaker to connect the magnetized transformer to the grid typically takes longer than the magnetization process. Combining the magnetization process and connection to the grid, the MMC capacitors may typically only lose less than 5% voltage.

Figure 5:
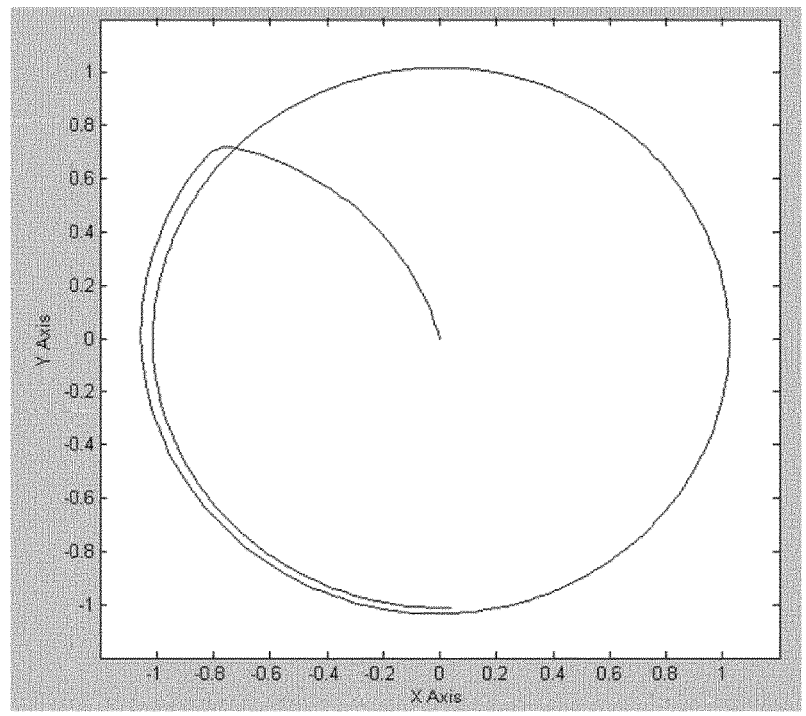
FIG. 5 depicts the two components of the transformer flux vector of FIG. 4 in 2D.

FIG. 5 depicts the two components of transformer flux vector of FIG. 4 plotted in two dimensions. The transformer flux vector starts at zero and increases out towards a one-per-unit-radius circle. The saturation point can be thought of as a perfect circle around zero with a magnitude one. When this limit is exceeded the effect of the reference voltage correction is to align the flux to rotate around the zero-centred circle with a one per-unit radius. The feed-forward approach implies that not ramping is needed, or in other words, that the voltage can be increased almost instantly, with the correction term providing for alignment of the flux vector trajectory.

Returning to FIG. 3 and the case where the feed-forward controller is based on the reasonable but unverified assumption that transformer magnetization has previously decayed to zero. As this assumption may not be true in all circumstances the initial estimate of the transformer flux may be wrong. In other words, if the transformer has remanent magnetization, or if the selected flux limit is too large, the transformer may still saturate resulting in excessive current. Therefore a subsequent feedback controller 10 may be necessary for limiting the transformer magnetizing current $I_{mag}$ circulating through the secondary windings of the main transformer in the event that the transformer should exhibit saturating effects. To that purpose, the transformer magnetizing current is measured and evaluated in the feedback controller that implements fast current limits if the transformer saturates. The feedback controller also has a droop characteristic that limits the current during the period that the transformer is connected to the grid, and if multiple parallel converters magnetize multiple parallel-connected or multiple-secondary transformers at the same time.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of pre-magnetizing a main transformer connected to a Modular Multilevel power Converter MMC with a plurality of converter cells each including a cell capacitor and power semiconductor switches, comprising in order disconnecting the main transformer from the MMC,
charging the cell capacitors of the MMC, and
pre-magnetizing the main transformer from energy stored in the cell capacitors of the MMC.

2. The method of claim 1, comprising
connecting a charging unit including an auxiliary power source to the MMC for charging the cell capacitors of the MMC, and
disconnecting the charging unit prior to pre-magnetizing the main transformer.

3. The method of claim 2, wherein the MMC is a Statcom for static power-factor correction.

4. The method of claim 2, wherein the main transformer is connected to an AC grid, the step of pre-magnetizing the main transformer comprising:
measuring a network voltage $V_N$ of the AC grid; and
determining, based on the network voltage $V_N$, a converter voltage reference $V_{ref}$ for the MMC.

5. The method of claim 4, wherein the MMC is a Statcom for static power-factor correction.

6. The method of claim 4, comprising correcting the converter voltage reference $V_{ref}$ to avoid saturation of a transformer core of the main transformer.

7. The method of claim 6, comprising:
estimating a transformer flux in the main transformer from the converter voltage reference $V_{ref}$, and
comparing a transformer flux magnitude of the main transformer flux to a limit.

8. The method of claim 1, wherein the main transformer is connected to an AC grid, the step of pre-magnetizing the main transformer comprising
measuring a network voltage $V_N$ of the AC grid, and
determining, based on the network voltage $V_N$, a converter voltage reference $V_{ref}$ for the MMC.

9. The method of claim 8, wherein the MMC is a Statcom for static power-factor correction.

10. The method of claim 8, comprising
correcting the converter voltage reference $V_{ref}$ to avoid saturation of a transformer core of the main transformer.

11. The method of claim 10, comprising
estimating a transformer flux in the main transformer from the converter voltage reference $V_{ref}$, and
comparing a transformer flux magnitude of the main transformer flux to a limit.

12. The method of claim 10, wherein the MMC is a Statcom for static power factor correction.

13. The method of claim 1, wherein the MMC is a Statcom for static power-factor correction.

14. An MMC controller for controlling operation of a Modular Multilevel power Converter MMC with a plurality of converter cells each including, a cell capacitor and power semiconductor switches, wherein the MMC is connected to a main transformer and wherein the MMC controller is configured to
control, upon charging of the cell capacitors and following connection of the main transformer to the MMC, by actively operating the power semiconductor switches, a pre-magnetization of the main transformer from energy stored in the cell capacitors of the MMC.

15. The MMC controller of claim 14, wherein the MMC is a Statcom for static power factor correction.

16. The MMC controller of claim 14, wherein the MMC controller is configured to determine, based on a network voltage $V_N$ of an AC grid to which the main transformer is connected, a converter voltage reference $V_{ref}$ for the MMC.

17. The MMC controller of claim 16, wherein the MMC is a Statcom for static power-factor correction.

18. The MMC controller of claim 16, wherein it is configured to correct the converter voltage reference $V_{ref}$ to avoid saturation of a transformer core of the main transformer.

19. The MMC controller of claim 18, wherein it is configured to estimate a transformer flux in the main transformer from the converter voltage reference $V_{ref}$, and to compare a transformer flux magnitude of the main transformer flux to a limit.

20. The MMC controller of claim 18, wherein the MMC is a Statcom for static power-factor correction.

* * * * *